R. RAY.
Clip for Fellies and Tires.

No. 167,938 Patented Sept. 21, 1875.

WITNESSES:
E. Wolff
A. F. Terry

INVENTOR:
Robert Ray
BY Munn & Co
ATTORNEYS.

UNITED STATES PATENT OFFICE.

ROBERT RAY, OF CARROLLTON, MISSISSIPPI.

IMPROVEMENT IN CLIPS FOR FELLIES AND TIRES.

Specification forming part of Letters Patent No. 167,938, dated September 21, 1875; application filed August 21, 1875.

*To all whom it may concern:*

Be it known that I, ROBERT RAY, of Carrollton, in the county of Carroll and State of Mississippi, have invented a new and Improved Felly-Joint and Tire-Holder, of which the following is a specification:

This invention consists of a metal clip to wrap around the joints of the felly of a wheel for splicing and holding it, and having flanges to clip the edges of the tire and hold the tire on the felly without bolts or screws.

Figure 1:
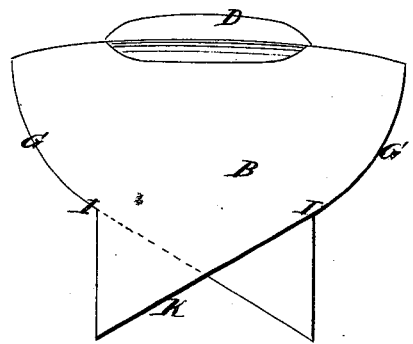
Figure 2:
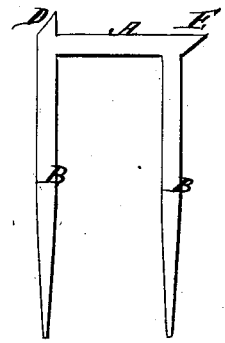
Figure 3:
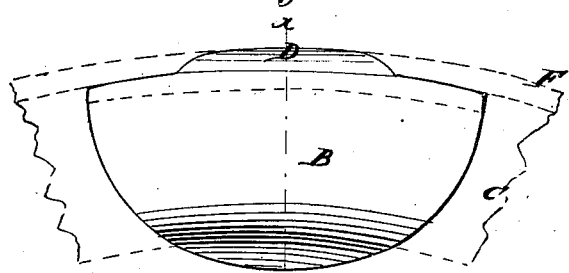
Figure 4:
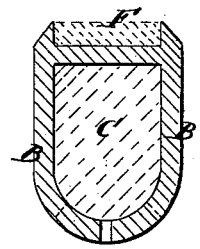

Figure 1 is a side elevation of the clip, and Fig. 2 is an end elevation, showing the form of the clip before it is applied. Fig. 3 is a side elevation. Fig. 4 is a section, and Figs. 5 and 6 are plan views, showing the clip after it is applied.

Similar letters of reference indicate corresponding parts.

A is a base-piece, of wrought or malleable iron, of suitable length, and about as wide as the felly and tire, with a flange, B, on each edge for wrapping around the felly C, and with narrow flanges D E to clip the edges of the tire F, the flange E being formed in the planes of the body A, to be hammered down tight against the edge of the tire, and bind it snugly between it and D, as shown in Fig. 3.

Figures 5, 6:
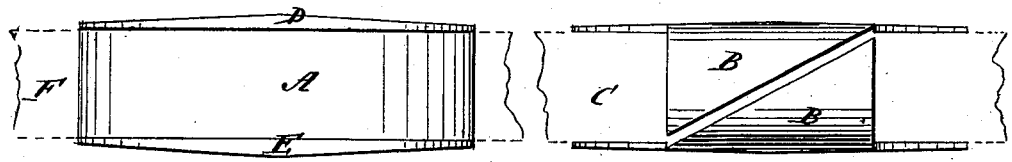

The flanges B are curved on the ends G about as high as the depth of the felly—say, to the point I—from which at one end they are perpendicular to the longitudinal axis of the clip, and from the other end they are formed on the right line K intersecting the perpendicular end, so that when bent over on the inner edge of the felly they interlap, as shown in Fig. 6. The fellies are notched on the tread to the length and thickness of the part A, so that it is flush with the fellies to permit the tire to bind alike on both. Thus it will be seen that the fellies are securely fastened together and the tire fastened on them without any holes and bolts in either, and so that in case they work loose by wear or by shrinkage of the wood they can be made tight merely by hammering the flanges a little.

Having thus described my invention, I claim as new and desire to secure by Letters Patent—

The improved felly and tire clip, composed of base A and flanges B D E, substantially as specified.

ROBERT RAY.

Witnesses:
  INNIS E. BATES,
  JOS. J. GEE.